United States Patent [19]
Hardy et al.

[11] Patent Number: 5,241,584
[45] Date of Patent: Aug. 31, 1993

[54] RESPONSE TIME EVALUATION UNIT

[75] Inventors: William C. Hardy, Alexandria, Va.; Thomas H. Johnson, Jr., Westminster, Md.

[73] Assignee: MCI Communications Corporation, Washington, D.C.

[21] Appl. No.: 570,778

[22] Filed: Aug. 22, 1990

[51] Int. Cl.⁵ .................. H04M 3/22; H04M 1/64
[52] U.S. Cl. .......................... 379/67; 379/34; 379/69; 379/266; 379/309; 379/113
[58] Field of Search ............ 379/67, 79, 70, 34, 379/69, 113, 266, 265, 309

[56] References Cited

U.S. PATENT DOCUMENTS

| | | | |
|---|---|---|---|
| 4,122,308 | 12/1978 | Weinberger et al. | 379/131 |
| 4,599,493 | 7/1986 | Cave | 379/247 |
| 4,602,129 | 7/1986 | Matthews et al. | 379/89 |
| 4,713,835 | 12/1987 | Bond et al. | 379/70 |
| 4,858,120 | 8/1989 | Samuelson | 379/309 |

*Primary Examiner*—James L. Dwyer
*Assistant Examiner*—Fan Tsang
*Attorney, Agent, or Firm*—Pollock, Vande Sande & Priddy

[57] ABSTRACT

The present invention automatically initiates a telephone call to a given destination. At the same time, the progress of the call is monitored. The time of a ring back and voice answer received from the destination are recorded to an output file. At the end of the voice answer, a pre-recorded voice message is sent by the system to the person answering at the destination. Thereafter, the recorded data is used to determine the response time for that particular telephone destination. A plurality of destinations can be tested.

17 Claims, 9 Drawing Sheets

RESPONSE TIME EVALUATION UNIT

FIELD OF THE INVENTION

The present invention relates to a method and apparatus for evaluating the response time of a telephone network, and more particularly to operator response time at a telephone switch exchange.

BACKGROUND OF THE INVENTION

When a person picks up a telephone and dials a particular number, the dial tones which are input to the telephone are sent to one telephone switch which may make a connection with another telephone switch for directing the call to the desired number. An amount of time must elapse between when the caller inputs the last digit to his telephone and when he receives a ring back from the destination telephone. This elapsed time is known as post-dial delay.

The post-dial delay is a characteristic (parameter) of a telephone network, in that it is different for different telephone connections. In fact, a post-dial delay is a function of the following: the speed with which a user dials his telephone; the type of connection to a long distance switch; the path through which the call is routed from the caller telephone to the receiver's telephone; and the type of PBX the user's telephone or the receiver telephone is connected to, if private branch exchanges are involved.

Figure 1:
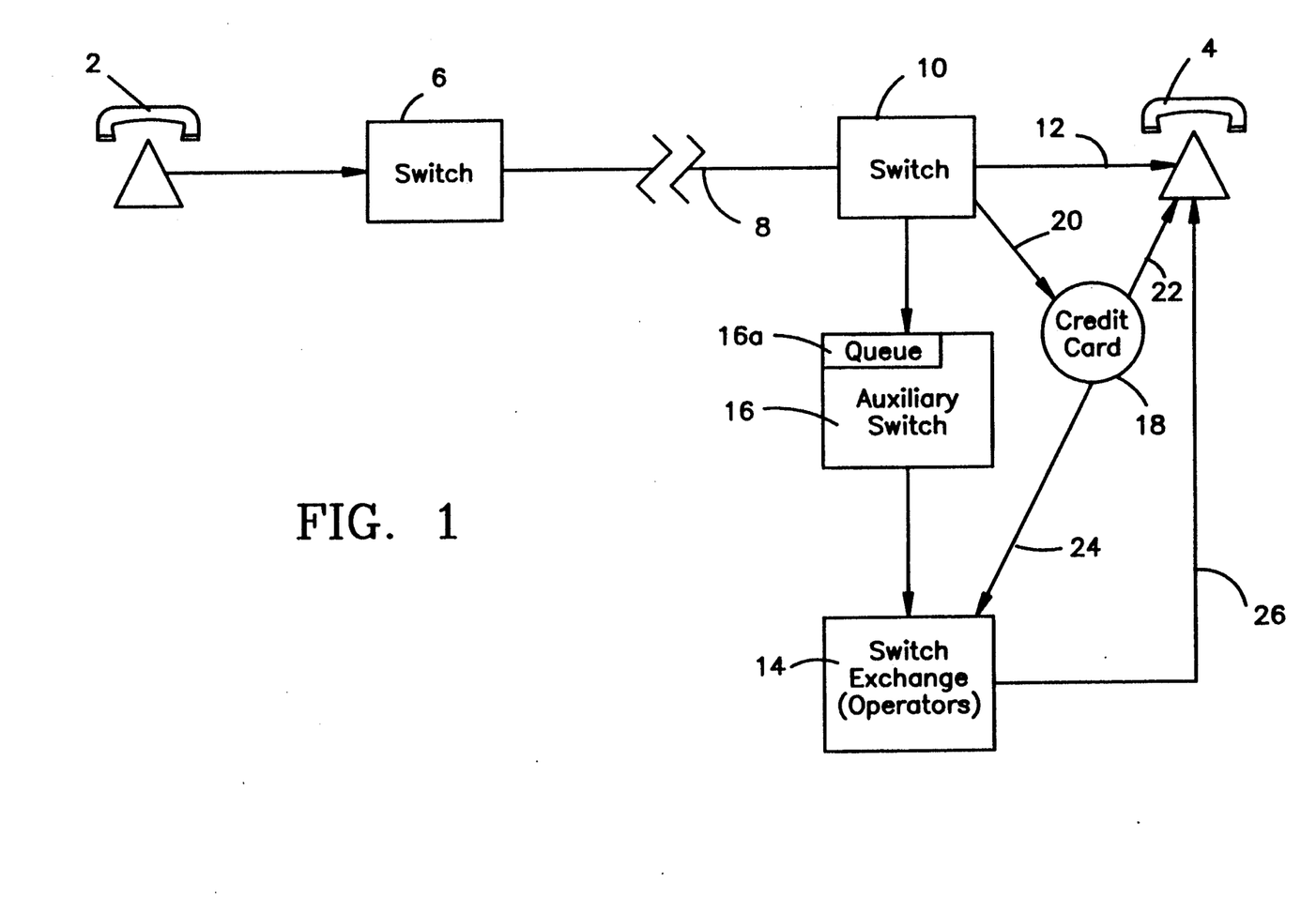
FIG. 1 is an overall view of a telephone network.

With reference to FIG. 1, a typical connection between caller telephone 2 and a receiver telephone 4 is shown. As was discussed previously, the digits that a caller inputs to his telephone are sent to a switch 6 and routed across telephone network line 8 to another switch 10, from whence the call is further routed to receiver telephone 4 via line 12. Ordinarily, the post-dial delay comprises the time between the input of the last digit by the caller and the ring back, from telephone 4. Thus, by measuring the post-dial delay, the time needed for a signal to cascade from telephone 2 to telephone 4 can be ascertained. This measurement of the post-dial delay is a characteristic of the telephone network which includes switches 6, 10 and the line leading from telephone 2 to switch 6 and lines 8 and 12.

Oftentimes, however, a user may want to obtain information from an operator or make an operator assisted call. This is done by routing the call to a switch exchange, such as 14, where a number of operators are located. Inasmuch as the number of incoming calls are likely to exceed the number of operators available, the calls are first sent to an auxiliary switch 16 and held by a queue 16a, so that the incoming calls are answered by the operators in a first in first out manner. Thus, when a caller attempts to call an operator, the call is first routed to auxiliary switch 16 and a ring back is provided thereby. After a few rings, an available operator would answer the call and assist the caller. This is all well and good so long as there are sufficient number of operators to handle the incoming calls. However, if there is insufficient number of operators, queue 16a can grow quite lengthy and the caller will be on hold for a long time. When this occurs, most callers would just hang up. Consequently, charges that otherwise would have been earned from operator assisted calls are lost.

Likewise, when a caller is making a credit card call, in most instances the call is routed, after switch 6 and switch 10, to credit card switch 18 via line 20. A signal such as a bong tone is then provided by credit card switch 18 back to telephone 2 to inform the caller to input the desired credit card number. If the correct credit card number is input, usually the call is routed to telephone 4 via line 22. However, if the wrong credit card number was input, usually after several attempts, the call is routed to switch exchange 14 via line 24, so that an operator can intercept the call. If the correct information can then be obtained at that time, the call is routed from switch exchange 14 to line 26 and then telephone 4. Like the queue formed at auxiliary switch 16, if the caller has to wait an inordinate amount of time before an operator answers, chances are the caller will hang up. Accordingly, potential charges are lost.

Thus, there is a need to provide a sufficient number of available operators at switch exchange 14 to handle the incoming calls. But insofar as the demand for operator assisted calls varies throughout the day—for example the demand is much lower at 3:00 a.m. than at 11:00 a.m. or 1:00 p.m.—and the cost of maintaining a large number of idle operators is substantial, the number of available operators must be balanced against the various demand call patterns occurring throughout the day.

SUMMARY OF THE PRESENT INVENTION

The method and apparatus of the present invention can be used to determine the time it takes for an operator (or a person) to answer a call so that an optimal number of operators is utilized at a switch exchange at a particular time of day, in order to reduce the queue time for a caller to reach an operator.

To achieve this end, the present invention uses a computer controlled system, interfaced with the telephone network being evaluated, to measure the time required for an operator to answer a call. In particular, dial tones for effecting a call to a chosen destination, for example a switch exchange, are generated by a dual tone multi-frequency transceiver (DTMF) and sent though a telephone line interface unit to a conventional telephone line. Upon reaching the destination, but before being answered by an operator, the call, as was discussed before, is placed in an auxiliary switch and put in queue. A ring back signal is then fed from the auxiliary switch to the system via the telephone line interface.

A call progress detector, in the meantime, watches the progress of the call and discriminates the received audible tones, for example as a ring back. The time elapsed before the ring back is received is recorded. When an operator answers, the voice response is detected as such by a voice detect circuit and the time at which a voice answer is received is also recorded. Upon detection of the completion of the voice answer, a prerecorded voice message is transmitted by a PCM CODEC transceiver, via the telephone line interface, to the switch exchange to inform the operator that the call is a test and no assistance is needed. Of course, other types of voice messages can also be sent. After that, the system hangs up on the pre-chosen destination and attempts can be made on other chosen destinations throughout the telephone network.

The respective operations of the different components of the system are controlled by a processor, for example a personal computer (PC) such as an IBM PS/2, model 30. The different components of the system can be fabricated onto a printed circuit board which can be inserted into an available expansion slot in the PC. A buffer for providing interface between the PC and the different components is also built into the system.

By thus measuring the time response of operators at different switch exchanges, characteristics of the network are determined and taken into consideration to evaluate the optimal balance between the number of available operators and the time which a caller has to wait before being assisted by one of the available operators.

It is, therefore, an objective of the present invention to provide a system that automatically measures the response time by an operator, at a given switch exchange, so that an optimal number of available operators may be present at that switch exchange at a given time of the day.

It is another object of the present invention to provide a system that automatically maintains a record of response times for different switch exchanges.

BRIEF DESCRIPTION OF THE FIGURES

The above-mentioned objective and advantages of the present invention will become more apparent and the invention itself will be best understood by reference to the following description of an embodiment of the invention taken in conjunction with the accompanying drawings, wherein.

DETAILED DESCRIPTION OF THE PRESENT INVENTION

Figure 2:
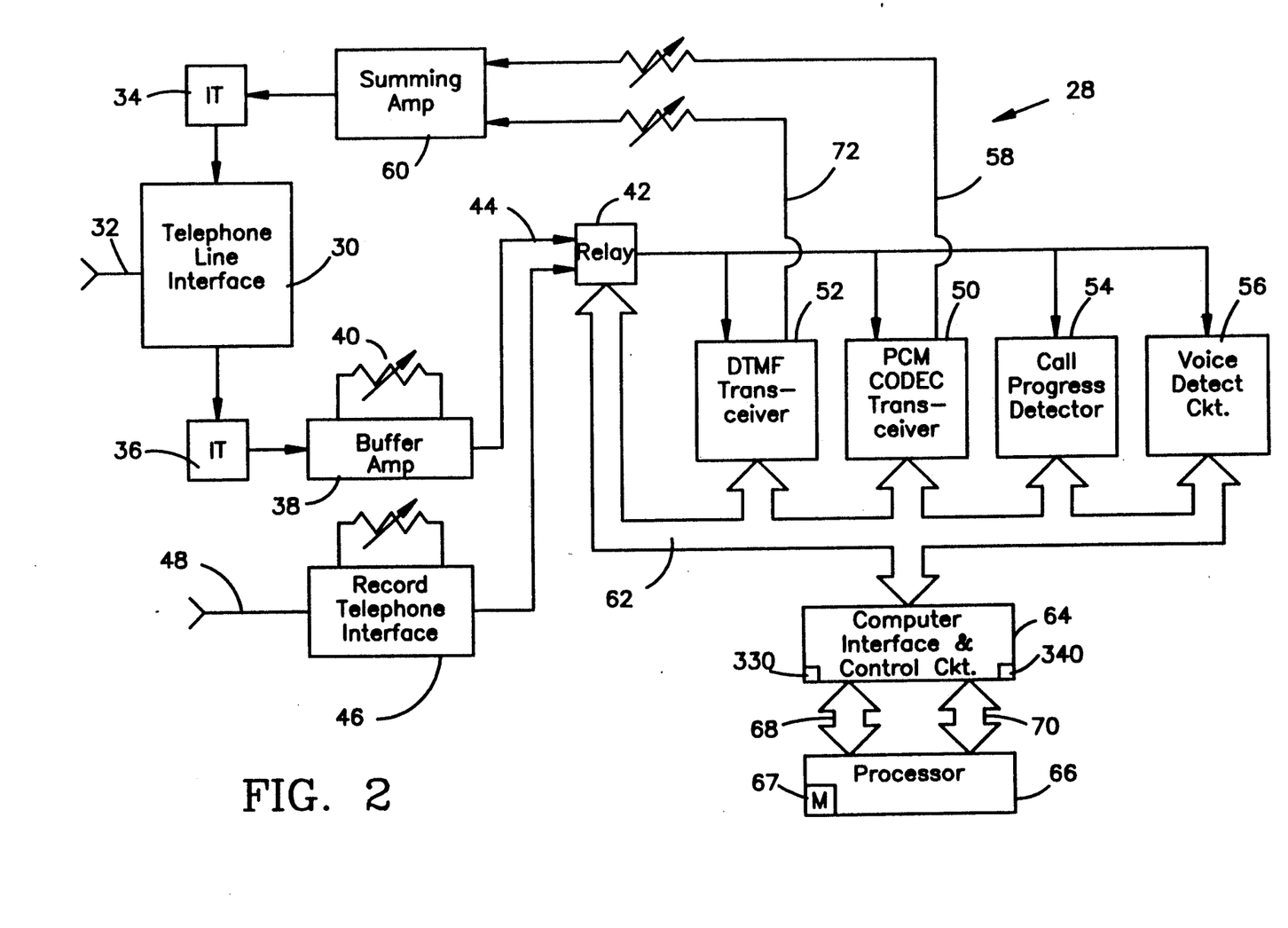
FIG. 2 is a block diagram of the hardware components of the present invention.

As shown in FIG. 2, the apparatus of the present invention (i.e. system board 28) has a telephone line interface 30, which may be a Motorola MC34010P Integrated Circuit (IC) chip, for providing an interface between system 28 and a standard telephone line 32. Telephone line interface 30 is powered by current from the telephone line 32. To prevent any potential grounding problems, isolation transformers 34 and 36 are provided at the respective input and output of telephone line interface 30, to isolate the system's transmission and reception.

Basically, telephone line interface 30 takes signals of various levels from phone line 32 and/or the system, translates the signals, splits the transmission and reception signals into separate circuits and feeds the respective signals through isolation transformers 34 and 36 either to telephone line 32 or to the other component circuits of system 28 in the correct format and signal amplitude.

Signals from phone line 32, after having been translated by telephone line interface 30 into signals having the correct format and amplitude, are fed through isolation transformer 36 to a buffer amplifier 38, which has a user adjustable potentiometer 40. By adjusting the gain of buffer amplifier 38 to $-2$ dB, assuming that the input line level from isolation transformer 36 is $-16$ dB maximum, an optimal signal—in the form of audible tones such as ring back or voice—is provided as an output from buffer amplifier 38 to a relay 42.

Relay 42 is a conventional relay that has two modes: record and phone. For normal operation of system 28, relay 42 is set to its phone mode where it funnels the signals provided at the output of buffer amplifier 38, at lines 44, to the rest of the components in system 28. In its record mode, relay 42 is connected to a record telephone interface circuit 46, which has an input 48. Record telephone interface circuit 46 is a conventional circuit connectable via line 48 to a telephone line to allow the recordation of a voice message, to be fed via relay 42 to a pulse code modulation coder and decoder transceiver, i.e. PCM CODEC transceiver 50. Do note that the voice message in practice is first stored in a working memory, for example the RAM of a computer (such as to be discussed processor 66) and eventually stored as a disk file in a resident permanent memory of the computer, i.e. a hard disk for example illustrated as 67 in processor 66.

CODEC transceiver 50 uses a standard digitization scheme to band limit voice frequencies by, for example, 300 and 3300 Hz filters. An analog-to-digital transformation having an equivalent 12 bit accuracy is performed on the voice message. By a "companding" scheme whereby the larger signals are eliminated, the 12 bit accuracy information is compressed into an 8 bit word (u-255 companding). The 8 bit word is then stored in an array resident in processor 66 memory. For the embodiment of the present invention, the information can be retrieved from the array by retrieving file VOICE.DAT. CODEC transceiver 50 is a semiconductor chip manufactured by either SGS Thompson or National Semiconductor having the product number ETC5056, or equivalent. The digitized voice message is output from memory 67 of processor 66 through CODEC transceiver 50 when appropriate as will be described.

Another component of system 28 is a DTMF (dual tone multi-frequency) transceiver 52 that can generate and detect audible tones associated with a telephone network. DTMF transceiver 52 is a 75T2090 semiconductor chip made by Silicon Systems, Inc. of Tustin, Cal. The DTMF transceiver 52 can generate the DTMF dialing tones to initiate a call through phone line 32 and also detect DTMF tones received from phone line 32 such as a bong tone.

Also included in system 28 is a call progress detector 54 having device number NE5900 manufactured by the Signetics Corporation. Functionally, call progress detector 54 continuously monitors the call progress information being fed to system 28 and discriminates the type of information being provided by focussing at a particular frequency band, for example from 300 to 630 Hz, where most of the fundamental energies of the call progress information reside. The respective durations of the incoming signals, which may be dial tone, ring back, busy, or fast busy are recorded As is well know, dial tone is continuous; ring back has a duration of approximately 1.6 seconds on and 2.2 seconds off; busy has a duration of ½ second on and ½ a second off; and fast busy has a duration of a ¼ second on and a ¼ second off. In essence, call progress detector 54 examines the frequency band of interest, looks for the durations of the on and off times and classifies the examined signal as one of the above-noted tones.

A voice detect circuit 56, also included in system 28, is made from standard operational amplifiers for forming filters having accuracy similar to those in call progress detector 54. The filters in voice detect circuit 56 are set for detection from approximately 750 Hz to 4 KHz in the voice band where most of the energy of the incoming voice signal resides. Voice detect circuit 56 specifically detects a voice answer, which has significant energy within the 750 Hz to 4 KHz band, by way of its high pass filters. When a voice answer is detected, the output from the high pass filters is properly amplified and translated to a digital output to trigger the software to send out the voice message stored in the VOICE.DAT file through CODEC transceiver 50. The voice message is fed via line 58 to a summing amplifier, which routes it to isolation transformater 34 and telephone line interface 30, and then telephone line 32. A more detailed description of the interaction between voice detect circuit 56 and CODEC transceiver 50 is given below in the discussion of FIG. 3.

Relay 42, DTMF transceiver 52, CODEC transceiver 50, call progress detector 54 and voice detect circuit 56 are all connected to a bi-directional bus 62. Also connected to bus 62 is a computer interface and control circuit 64, which provides interfacing between the different components (i.e. component chips of system board 28) and processor 66 by way of address bus 68 and data bus 70. Computer interface and control circuit 64, in short, takes the multiple bit address from processor 66 and decodes it to the specific board address (of the system) to allow processor 66 to address and control each of the components. Processor 66, in this embodiment, may be a conventional IBM personal computer and system 28 may be fabricated on an expander board that is mated to one of the available expansion slots in the PC. For example, processor 66, by transmitting the appropriate addresses, can control DTMF transceiver 52 so that audible tones are generated thereby and fed to line 72, summing amplifier 60, phone line 32 and directed to the chosen destination. The level of the signals, on either line 58 or line 72, is adjusted by summing amplifier 60 so that an output signal having a corrected level which is compatible with the level required in the telephone network is fed to phone line 32.

To operate system 28, a program MCIOP.EXE, the operational steps of which are illustrated in FIG. 3 and FIGS. 3a to 3F in flow chart format, is executed. Used along with program MCIOP.EXE are a configuration file, a phone list file and an output file. The configuration file is preferably named CONFIG.DAT, whereas the names for the phone list file and the output file are specified in the second and third lines of the configuration file.

Configuration file CONFIG.DAT has 3 ASCII lines, as illustrated by the example below:
OxffeO
c:phone.dat
c:output.dat The first line of the CONFIG.DAT file contains a two byte hexidecimal number, or an integer number representing the base address of the system board. A base address for the system board is necessary inasmuch as there might be a number of boards plugged into the respective expansion slots of the PC The second line of the CONFIG.DAT file contains the file name of the phone list file, in this instance called PHONE.DAT. The third line of the CONFIG.DAT file contains the file name of the output file, i.e. OUTPUT.DAT.

An example of a phone list file is shown below.
5
0.1
0.1
9,0-301-595-4266
595-4266
5954266
12345678901234567890123456789012345678901 2345-6789
9,,,1-800-877-8000-12334-89888-989-0-415-432-2222

The first line of the phone list file contains an integer number that represents the number of times that the phone list should be cycled through. The second and third lines of the phone list file designate the DTMF on and off times, respectively. For the example phone list file shown, DTMF transceiver 52 would be generating tones of 0.1 second on and 0.1 second off. From line 4 onwards, the phone list file contains different telephone numbers, directed to different destinations, system 28 is to call in order to measure response times. The phone numbers can be up to 50 digits long, can contain the digits 0-9, hyphens, or commas. With the examples shown, each digit produces its corresponding DTMF tone for 0.1 second on and 0.1 second off. All hyphens are ignored. Each comma encountered produces a one second pause.

The output file is automatically created if it does not already exist. If it does, new records are appended to the end of the file, An example of an output file follows later.

Figure 3:
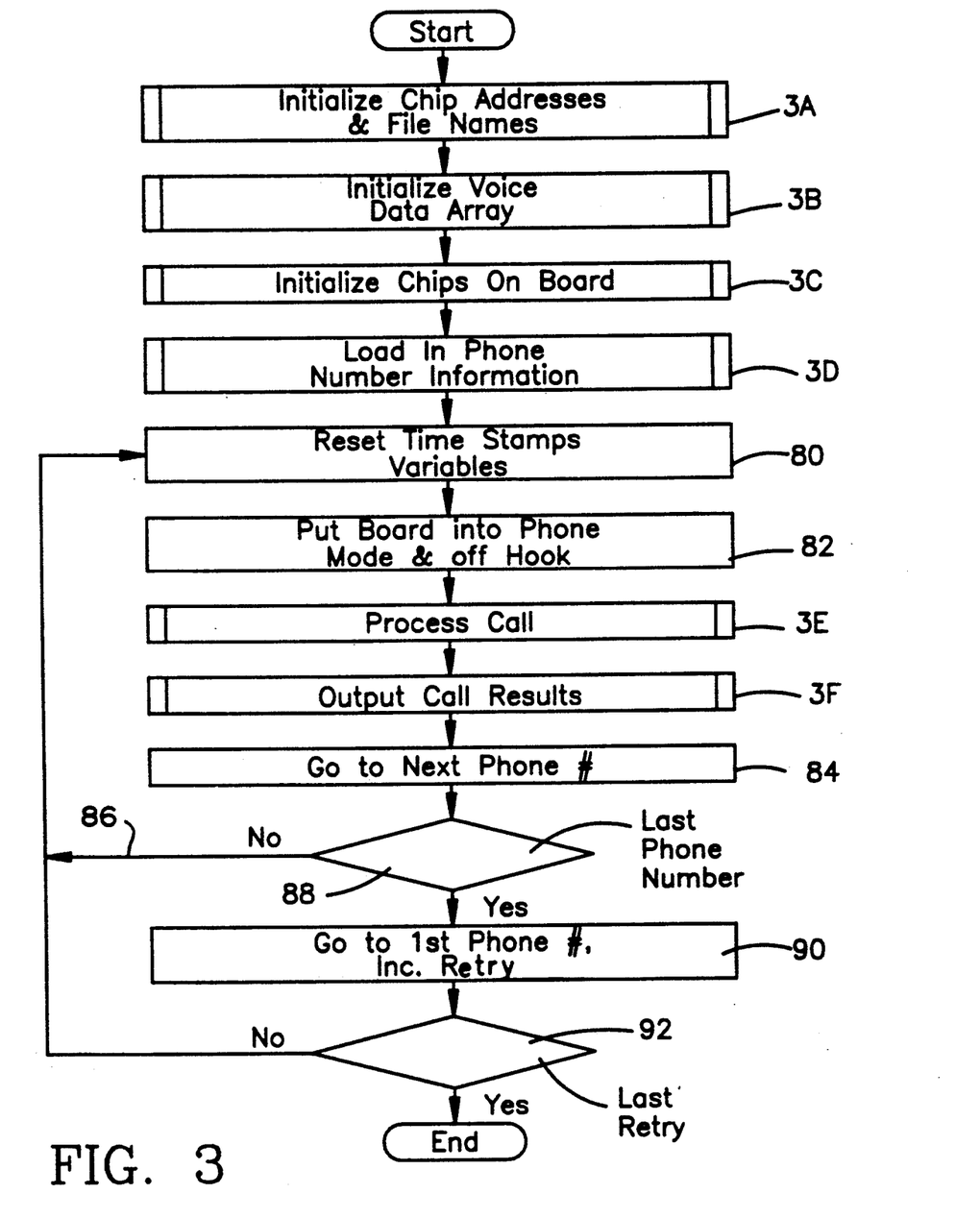
FIG. 3 is a top level flow chart illustrating an overall view of the operational steps of the present invention system.

With reference to FIG. 3, to operate, system 28 has to be first initiated per steps 3A to 3D.

Figure 3A:
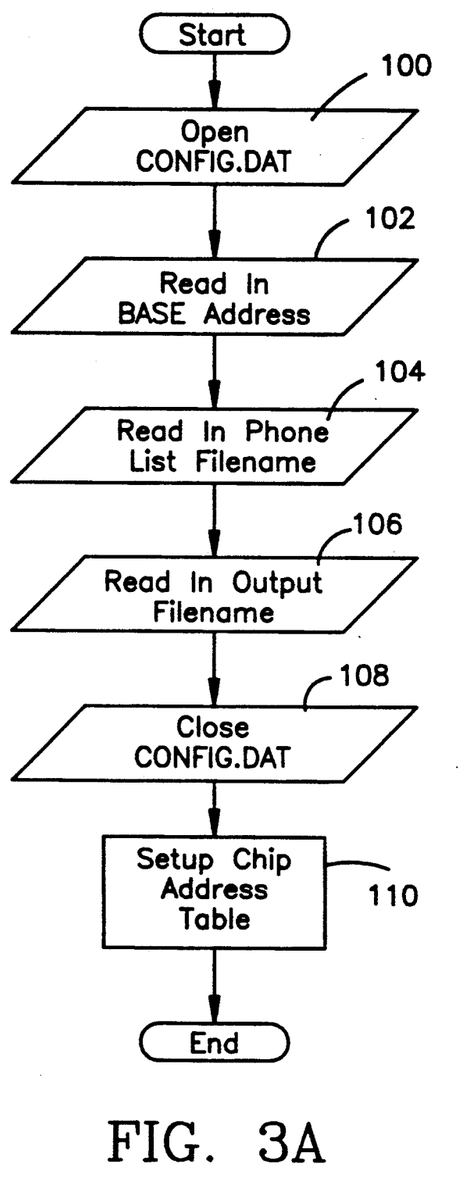
FIG. 3A is a detailed flow chart of block 3a of the FIG. 3 top level flow chart.

With reference to FIG. 3A, the following operations are performed in order to initialize the addresses of the component chips and the file name of system board 28. First, the configure file CONFIG.DAT is opened per operation 100. Next, the base address of the system is read in operation 102. Thereafter, the phone list file name (i.e. PHONE.DAT) is read from the second line of the configuration file by operation 104. The output file name (i.e. OUTPUT.DAT) is then read from line 3 of the configuration file in operation 106. After that, configuration file CONFIG.DAT is closed in operation 108. The addresses of the respective component chips DTMF transceiver 52, CODEC transceiver 50, call progress detector 54 and voice detector circuit 56 are thereafter set in operation 110. By performing operations 100 to 110, processor 66 sets up the appropriate addresses of system 28 (on the board).

Figure 3B:
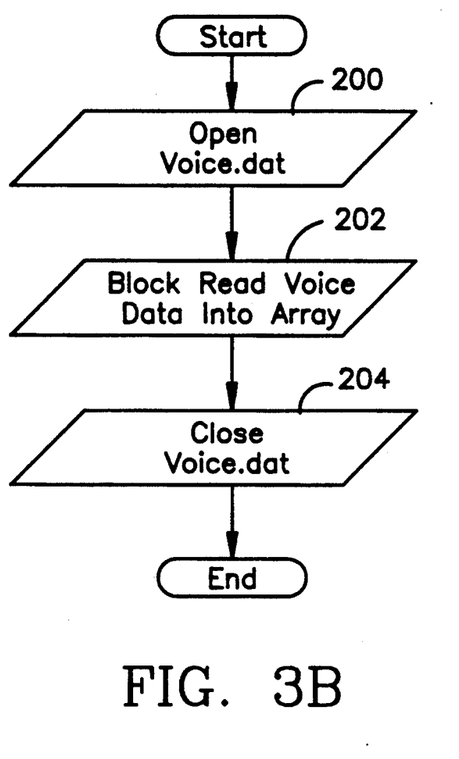
FIG. 3B is a detailed flow chart of block 3b of the FIG. 3 top level flow chart.

Assuming that system board 28 is present, the program proceeds to step 3B to initialize the digitized voice array in processor memory 67. As discussed earlier, a voice message, which lasts approximately 7.5 seconds for this embodiment, after having been appropriately digitized, is recorded by record telephone interface circuit 46 and stored in file VOICE.DAT in processor memory 67. With reference to FIG. 3B, in operation 200, the voice message file VOICE.DAT is opened. The stored data is read in operation 202. After which the voice message file is closed in operation 204. The set up step 3B, in essence, makes sure that there is in fact a voice message available to be played back in response to system 28 receiving a voice answer.

Figure 3C:
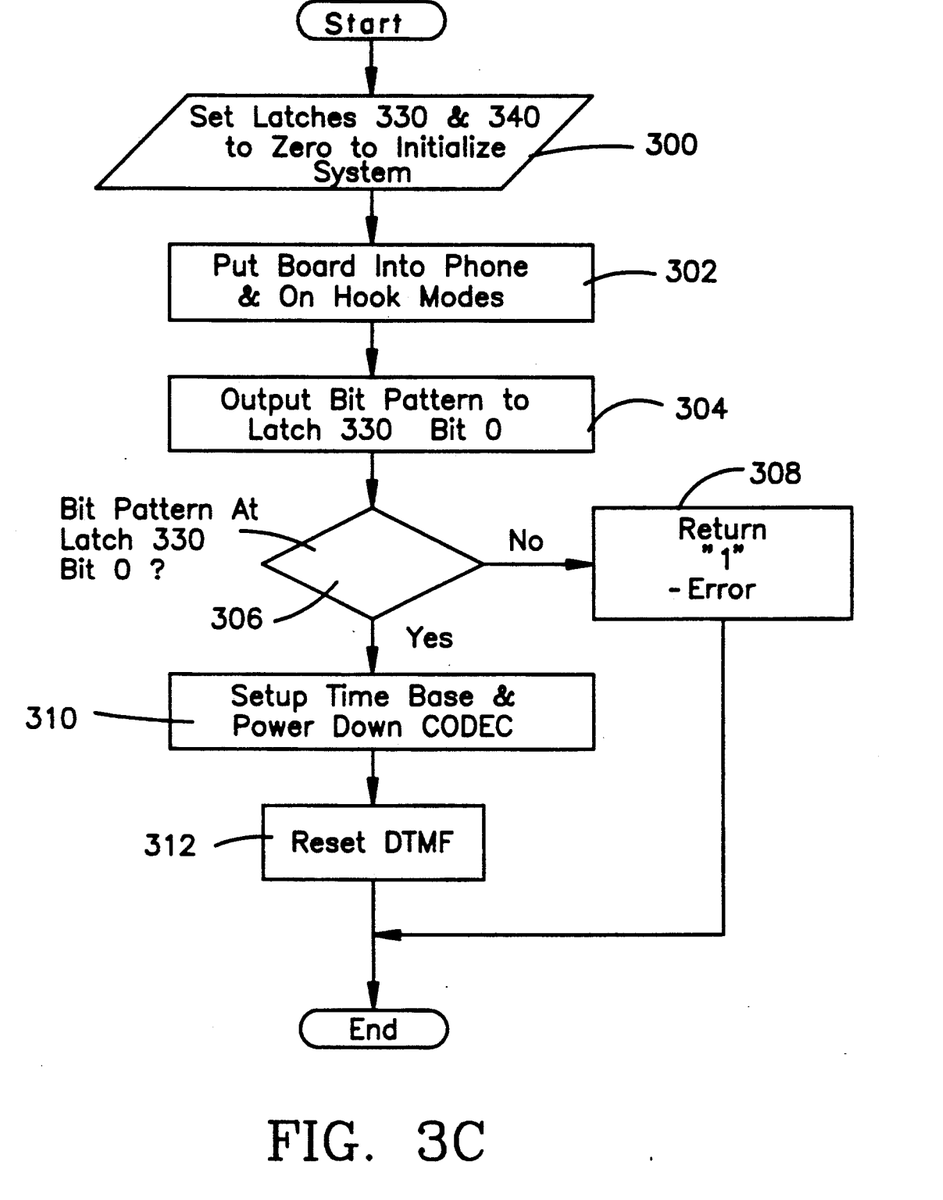
FIG. 3C is a detailed flow chart of block 3c of the FIG. 3 top level flow chart.

Upon completion of step 3B, the program proceeds to step 3C to initialize the different component chips in the system. To perform step 3C, two control latches 330 and 340 (shown in FIG. 2 to be part of computer interface and control circuit 64) are used to set up the different controls, by interfacing the different component chips with processor 66. To elaborate, all computer actions, for example read and write functions, are initiated by the program. These functions are synchronous and last only for a brief period of time, for example 100 usec for the read cycle and 300 usec for the write cycle. Latches 330 and 340 enable both read and write of the different component chips during the running of the program.

When the latches are set to zero in operation 300, the different component chips of system 28 are initialized. System board 28 is put on hook, i.e. opening a switch in telephone line interface 30 to make sure that phone line 32 is not active during program initialization, and put into phone mode in operation 302, where relay 42 now acts as a direct conduit for funneling information between the different components of system board 28 and phone line 32. All inputs therefore come from telephone line interface 30 at this time. Both of the on hook and phone mode functions are controlled, of course, by latches 330 and 340.

In operation 304, a test is performed to determine whether or not system board 28 is present, or has been securely inserted into an expansion slot in processor 66. In other words, via computer interface and control circuit 64, processor 66 confirms whether system board 28 is in fact present at the appropriate address set up in step 3A. If no confirmation is received, the program should end since no board is perceived to be present.

The test involves the writing of different valued bits (bit patterns) to one of the latches and the reading of the values of the corresponding bits (bit patterns) output from the latch. In essence, if there is a board present, the values of the respective output bits would correspond to the values of the input bits. On the other hand, if there is no board present (or a faulty board), the values of the respective output bits would not correspond to the values of the input bits. The comparison to determine whether there is a correspondence between the write and read bit patterns is made in operation 306. If there is an error, the program proceeds to operation 308, noting the error and quits. If the bit patterns correspond, the program proceeds to operation 310 to set a time base and power down CODEC transceiver 50. A time base is needed insofar as all of the functions determined by system board 28 have to be synchronous.

To set up a time base, a crystal oscillator (not shown) on system board 28 feeds, for example, a 1.536 MHz frequency to a conventional programmable timer, such as an Intel 8254 chip. The programmable timer chip then divides the 1.536 MHz frequency by 192 to get down to the standard time base of 8 KHz (for this example), so that all the component chips on system board 28 run at that frequency Putting it differently, a signal from phone line 32 is therefore sampled at 8000 times per second, or converted from analog-to-digital every 125 usec. Once the time base is set, to conserve power, CODEC transceiver 50 is powered down in operation 310. In operation 312, DTMF transceiver 52 is reset in preparation for operation. Operation 312 ensures that no arbitrary pulses are output from DTMF transceiver 52.

Figure 3D:
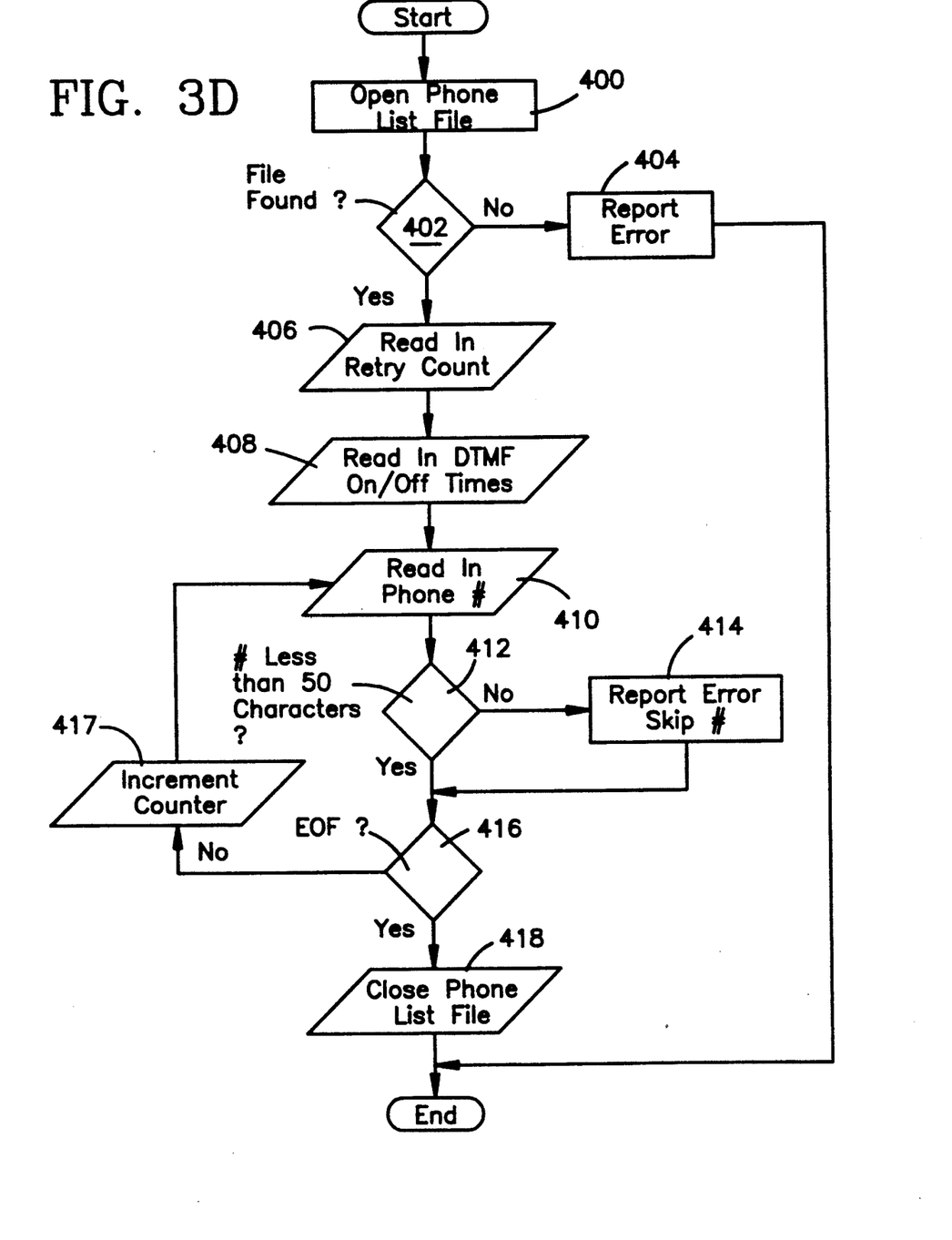
FIG. 3D is a detailed flow chart of block 3d of the FIG. 3 top level flow chart.

After the different component chips on system board 28 have been initialized, the program proceeds to step 3D to load in the phone number information, as shown in detail in FIG. 3D.

In operation 400, the phone list file, in this instance PHONE.DAT, is opened. Whether or not a phone list file is found is determined in operation 402. If there is no phone list file found, the program reports an error in operation 404 and quits. If there is indeed a phone list file, the first line of the phone list, in our example a five (5), is read in operation 406. In operation 408, the second and third lines, corresponding to respective on and off times of DTMF transceiver 52, are read. The phone number on the next line of the phone list file is then read in operation 410. If this telephone number contains more than 50 characters, per determination in operation 412, the line is skipped and an error is reported in operation 414. If the phone number indeed has less than 50 characters, the program then determines whether that phone number is the last in phone list file in operation 416. If it is not, the program increments a counter in operation 417 returns to operation 410, and reads the next phone number from the next line in the phone list file. If it is the end of the file, the phone list file is closed in operation 418 and the program proceeds to step 80 (FIG. 3) by resetting the different time variables of the different components of system 28 to zero (0) so that a call may be initiated from system board 28 to the desired destination(s). The first destination is shown at line 4 of the example phone list file.

The program next proceeds to step 82, shown in FIG. 3, to put system board 28 into phone mode and off hook to begin interfacing with phone line 32 via telephone interface 30. At this time, a dial tone is detected by system 28, more specifically by call progress detector 54, from phone line 32.

Figure 3E:
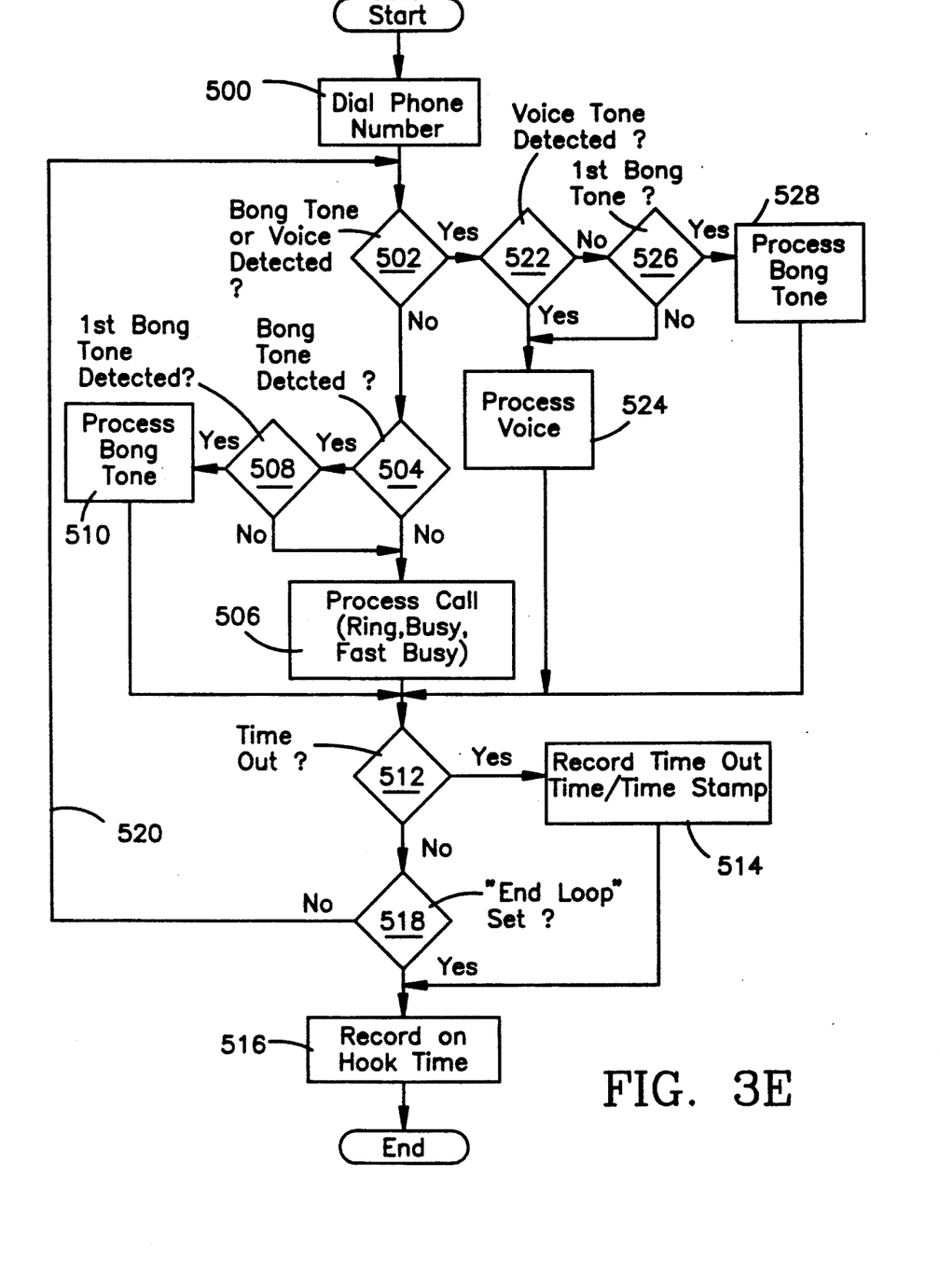
FIG. 3E is a detailed flow chart of block 3e of the FIG. 3 top level flow chart.

The program next proceeds to step 3E, shown in detail in FIG. 3E. The process call step of FIG. 3E begins by dialing the first phone number listed in the phone list file, as the first chosen destination, in operation 500. The audible tones for generating the call are produced by DTMF transceiver 52 and fed through line 72 to summing amplifier 60, isolation transformer 42, telephone interface 30, and phone line 32. The on and off times read from respective lines 2 and 3 of the phone list file are taken into consideration by DTMF transceiver 52 in producing the audible tones.

At this time, the program continuously scans the signals being fed back to the system from phone line 32 to determine if any of the possible tones such as ring back, busy, fast busy, bong or voice is received by the system. Whether a bong tone or a voice is detected is determined in operation 502. In operation 504, the program further queries whether a bong tone has been detected. If not, the program assumes that one of the remaining possible tones—such as ring back, busy or fast busy—is present and it orders call process detector 54 to process the respective tones by, for example, counting the number of rings and stamping the time at which the ring(s) or other tones were detected. The stamped times are recorded in operation 506.

If a bong tone is detected, the program proceeds to operation 508 to determine whether this is a first of the bong tones. If it is not, the program returns to operation 506. If it is, the first bong tone is processed in operation 510 by having the time at which the system first detects the bong tone time stamped and recorded. Thereafter, the program proceeds to operation 512 to determine whether this call has reached its time limit (time out). Time out only occurs if the phone is never answered and none of the call progress tones are detected. If time out has occurred for the routine, then the different measured parameters are recorded in operation 514 and the program proceeds to operation 516 to record the time the call is ended. After that, this routine ends and control is passed to step 3F in FIG. 3. On the other hand, if time out has not been reached, the program proceeds to operation 518 to determine whether "end loop" is set. "End loop" is set by any of the signal detect operations in this routine. After a valid signal is detected, "end loop" is set so that this routine ends. If yes, the program proceeds to operation 516 to record the time the call is completed (on hook). If not, by way of line 520, the program returns to operation 502 to once again monitor the signal being provided to the system from phone line 32 to determine if it is an of the possible signals including bong tone, voice, busy, fast busy, or ring back.

If a voice response is detected in operation 522, the moment at which the voice was first detected by voice detect circuit 56 is recorded in operation 524. The program then proceeds to operation 512, to again determine whether the program is to continue to run. If no voice is detected, the program then determines whether the input signal from phone line 32 is a first bong tone in operation 526. If it is not, given the fact that there can legally only be one bong tone, by process of elimination, voice must have been detected. At which case, the program proceeds to operation 524 to process the detected voice. If it is a first bong tone, the program proceeds to operation 528 to process the bong tone by recording the time when the bong tone was first discriminated by call progress detector 54. The time duration after the bong tone and before the operator intercepts the call is also recorded. Thus, by processing the bong tone and the time taken by an operator to answer after the first bong tone, the program can provide the user of system board 28 the parameters necessary to determine the optimal number of operators required to answer credit card calls.

The reason that both bong tone and voice are to be detected together in operation 502 is due to the fact that bong tone falls within the frequency of voice detect circuit 56. Hence, the different branches in FIG. 3E are required to separate the voice from bong. In other words, by following the different branches in FIG. 3E, voice can be detected and processed by operations 522 and 524. Similarly, bong can be detected by operations 502, 504, 508 and 510 along one branch; and 502, 522, 526 and 528 along another branch.

It should be noted that it is at operation 524, i.e. process voice, that the program decides that there is a voice answer. And at the end of the voice answer, the program sends out through CODEC transceiver 50 the stored voice message to the desired destination. The operation illustrated in FIG. 3E continues through the main central loop as long as none of the valid network responses except ring back is detected. If any signal is detected which causes a side branch to be executed, end loop will be set in that branch which will end this loop. If time runs out, as determined in operation 512, the time out is recorded in operation 514 and the on hook time likewise is recorded in operation 516. After which the program proceeds to step 3F, shown in FIG. 3 and in detail in FIG. 3F.

Figure 3F:
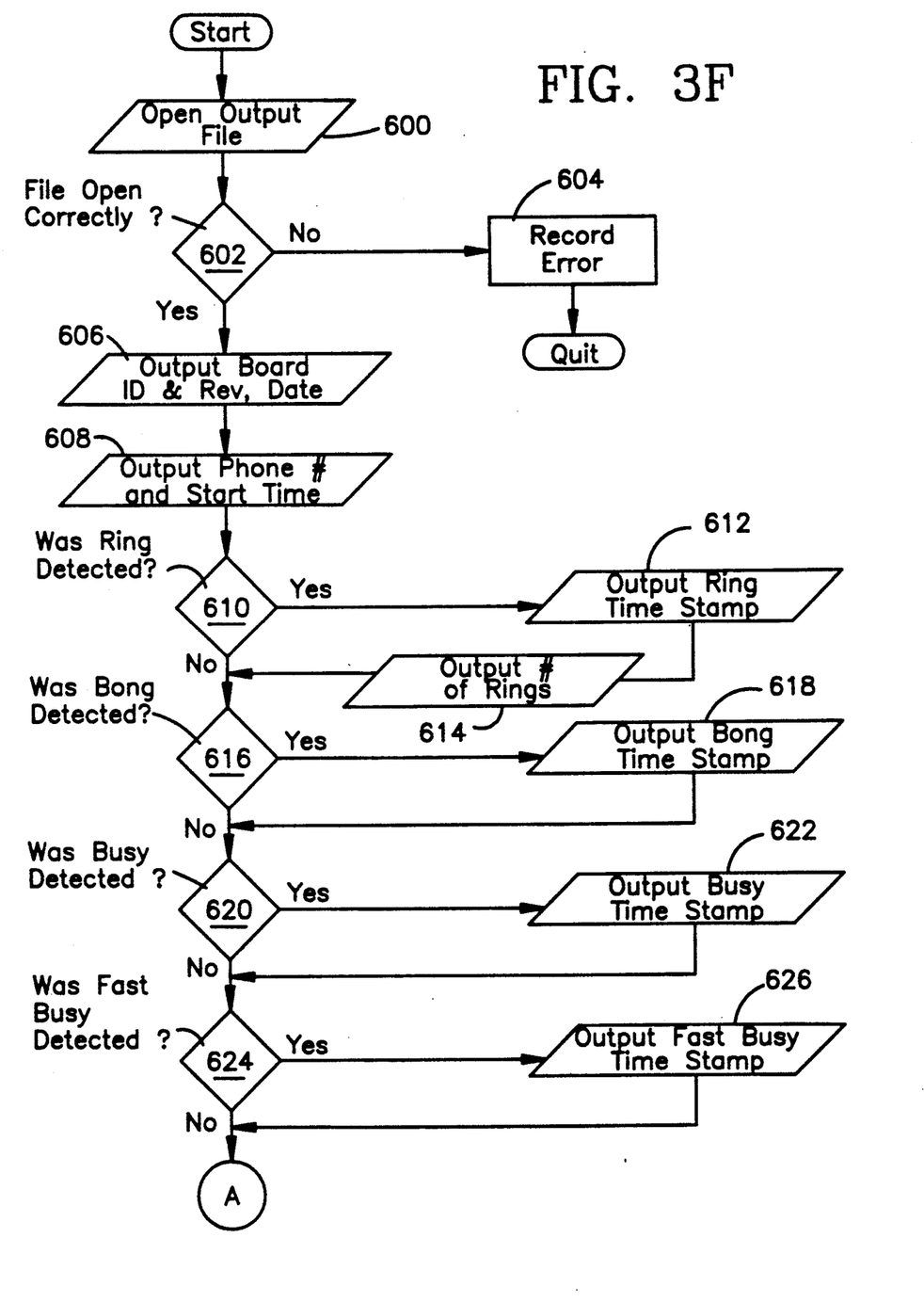
FIG. 3F is a detailed flow chart of block 3f of the FIG. 3 top level flow chart.

The various data recorded in step 3E are stored by the operations of step 3F. To begin with, the output file OUTPUT.DAT is opened in operation 600. Whether or not the output file is opened correctly is determined in operation 602. If it is not, an error is recorded in operation 604 and the program quits. If it is, the information relating to the board such as its identification and revision number, as well as the date on which the test is taken, are recorded at the first three lines of the output file in operation 606. In operation 608, the time at which call processing begins and the phone number(s) dialed are also recorded.

In operation 610, a determination is made on whether a ring has been detected. If it has, the time at which the ring began is recorded in operation 612. The number of rings received is likewise recorded in operation 614. Operation 616 determines whether a bong tone has been detected. If it has, the time at which the bong tone was detected is recorded in operation 618. The program then proceeds to operation 620 to determine whether a busy tone has been detected. If it has, the time at which the busy tone was detected is recorded in operation 622. The same procedure is followed in operation 624 to determine whether a fast busy tone has been detected. If it has, the information relating to when the fast busy tone was detected is recorded in operation 626.

In operation 628, the program determines whether there is a voice answer. If there is, the time at which it is detected is recorded in operation 630. Operation 636 determines whether there was any answer transmitted from the destination at all throughout the allotted evaluation time period. If there was no answer at all, (i.e. time out was detected in step 3D) this information likewise is recorded in operation 638.

There is always the possibility that a noisy phone line would be encountered which would render voice detect circuit 56 to wrongly construe that voice is present, when in fact it is not. In such instance, if there is no built-in predetermined time period (for example 45 seconds) to signal the end of any voice response, the system would continue to monitor the noisy phone line indefinitely. Thus, as a safeguard, operation 640 determines whether an answer was received, but silence was not detected, after the voice answer. If the time limit is reached after voice detect, the time is recorded in operation 642. The end of the call time is recorded in operation 646. Thereafter, the program closes the output file in operation 648.

Having thus evaluated the first phone number in the phone number list, the program proceeds to the next phone number in step 84. If the end of file marker has not been reached, the program returns to step 80 via return path 86 to begin anew the operations discussed with respect to steps 80, 82, 3E and 3F. If the phone number just finished is in fact the last phone number in the phone list file, as determined in step 88, the program continues to step 90 whereby the first phone number on the list is retried. The number of retries for each phone number is, again, determined by line 1 of the phone list file. The program continues until, as determined by step 92, that it is the last retry. At which time the program quits.

An example of the output file, with its representation codes, is given below. As shown, each piece of information is contained on its own line within the output file. A unique one letter code, followed by a colon and a space, proceeds each line of information. Error codes are represented by one unique number followed by a colon, a space and the time the error occurred. As should be noticed, the example given shows that two telephone numbers 595-4266 and 595-4267 have been evaluated and the resulting parameters recorded.

| CODE | CODE REPRESENTATION | [TYPICAL FORMAT] |
|---|---|---|
| A: | PRINTED CIRCUIT BOARD I.D. NUMBER | [1] |
| B: | PRINTED CIRCUIT BOARD REVISION NUMBER | [0] |
| E: | DATE | [Wed Jan 31 1990] |
| F: | TIME AT START OF CALL PROCESSING | [18:29:30:690] |
| G: | PHONE NUMBER DIALED | [9,0-301-595-4266] |
| H: | TIME AT END OF DIALING | [18:29:30:690] |
| I: | TIME AT BEGINNING OF RING | [18:29:30:690] |
| J: | NUMBER OF RINGS (RING BACK) | [18:29:30:700] |
| K: | TIME AT BUSY DETECT | [18:29:30:700] |
| L: | TIME AT FAST BUSY DETECT | [18:29:30:700] |
| M: | TIME AT BONG DETECT | [18:29:30:700] |
| N: | TIME AT VOICE ANSWER | [18:29:30:700] |
| P: | TIME AT TIME OUT, NO ANSWER | [18:29:30:700] |
| S: | TIME AT AFTER ANSWER AND NO SILENCE | [18:29:30:700] |
| T: | TIME AT "ON HOOK", DONE | [18:29:30:700] |
| FATAL ERROR CODES: | | |
| 1: | BOARD NOT FOUND | [18:29:30:700] |
| 2: | PHONE LIST FILE NOT FOUND | [18:29:30:700] |
| 3: | NO ENTRIES IN PHONE LIST FILE | [18:29:30:700] |
| 4: | PHONE NUMBER EXCEEDS 50 CHARACTERS | [18:29:30:700] |
| 5: | CAN NOT OPEN OUTPUT FILE | [18:29:30:700] |
| 6: | CAN NOT OPEN VOICE DATE FILE | [18:29:30:700] |
| 7: | CAN NOT OPEN CONFIGURATION FILE | [18:29:30:700] |
| 8: | CAN NOT GET BASE ADDRESS FROM CONFIGURATION FILE | [18:29:30:700] |
| 9: | DIAL TONE NOT FOUND | [18:29:30:700] |
| An example of an output file is: | | |
| A: | 1 | |
| B: | 0 | |
| E: | Fri Feb 02 1990 | |
| G: | 595-4266 | |
| H: | 13:19:05:340 | |
| I: | 13:19:09:070 | |
| J: | 2 | |
| N: | 13:19:16:540 | |
| T: | 13:19::21:980 | |
| . | | |
| . | | |
| A: | 1 | |
| B: | 0 | |
| E: | Fri Feb 02 1990 | |
| G: | 595-4267 | |
| H: | 14:19:05:340 | |
| I: | 14:19:09:070 | |
| J: | 2 | |
| N: | 14:19:16:540 | |
| T: | 14:19:21:980 | |

In brief, the system of the present invention operates as follows. First, the component chips on the system board, the system board address and the respective names of the configuration file, the phone list file and the output files are initialized. Next, a voice message is recorded, digitized and stored in memory 67 of processor 66 for transmission through CODEC transceiver 50. Thereafter the component chips such as DTMF transceiver 52, CODEC transceiver 50, call progress detector 54 and voice detect circuit 56 are initialized. The phone number information is then loaded into the system by opening the phone list file. All of these operations are performed prior to the actual evaluation of the response time of the desired destination telephone number representative of, for example, a switch exchange.

To begin evaluation, the various time variables are reset to zero. The system board is set to a phone mode and connected to the phone line. Tones representative of the first read phone number is generated in DTMF transceiver 52 and fed, with proper amplification by summing amplifier 60 to phone line 32 and sent to the desired telephone number destination (telephone exchange). At the same time, call progress detector 54 begins to monitor the progress of the call. The first ring back received from the destination is noted, as is the number of rings received before a voice answer is detected by voice detect circuit 56. The time at which the voice answer was first detected is likewise recorded.

After the voice answer ends, CODEC transceiver 50 sends the previously stored voice message to the destination to verbally answer the person who answered. Do note that different types of voice messages may be sent. After the voice message has been sent, the system disconnects from the first read telephone number and continues to the next telephone number, if any, in the phone list file. The process of ringing a given destination, waiting for the ring back, counting the number of ring backs, waiting for a voice answer and answering the voice answer with a voice message is repeated for each of the phone numbers listed in the phone list file.

In a case where a credit card switch exchange is called, the system discriminates, by means of DTMF transceiver 52, whether the received return tone is a bong, or other network response. If a bong tone is received, the system waits until an operator gets on line and gives a voice answer. At which time the voice message to the operator is sent.

After each phone number in the phone list file has been called, the various data relating to the different network responses are recorded. By manipulating the different recorded data, such as for instance the measured time from which a first ring back was received and the time thereafter until an operator answers, an accurate assessment of the optimal number of operators required at a given destination switch exchange can be ascertained. For example, if it has been determined that a caller typically hangs up if no operator answers after five (5) ring backs, more operators may be added to shorten the number of ring backs to four (4). Conversely, if it has been determined that for a particular destination switch exchange, an operator would answer after only one (1) ring back, a smaller number of operators is made available at that switch exchange. Thus, the optimal number of operators at a given time period can be ascertained for each evaluated switch exchange.

Inasmuch as the present invention is subject to many variations, modifications, and changes in detail, it is intended that all matter described throughout this specification and shown in the accompanying drawings be interpreted as illustrative only and not in a limiting sense. Accordingly, it is intended that the invention be limited only by the spirit and scope of the appended claims.

We claim:

1. A response time evaluating system in a telecommunication network, comprising:
   means for sending a signal to a destination;
   means for detecting and discriminating a response signal in reply to said sent signal;
   means for establishing when, after detection and first discrimination of said response signal, a voice answer is transmitted from said destination;
   means for dispatching a voice message to said destination in reply to said voice answer;
   wherein said system terminates connection to said destination in response to the completion of said voice message;
   wherein said establishing means comprises means working cooperatively with said detecting and discriminating means for monitoring the process and recording the time of occurrence of said response signal; and
   processor means connected to said detecting and discriminating means and said monitoring means for determining the type of response signal received and when said voice answer was transmitted from said destination to evaluate the response time of said destination.

2. A response time evaluating system in a telecommunication network, comprising:
   means for sending a signal to a destination;
   means for detecting and discriminating a response signal in reply to said sen signal;
   means for establishing when, after detection and first discrimination of said response signal, a voice answer is transmitted from said destination;
   means for dispatching a voice message to said destination in reply to said voice answer;
   wherein said establishing means comprises means working cooperatively with said detecting and discriminating means for monitoring the progress and recording the time of occurrence of said response signal; and
   processor means connected to said detecting and discriminating means and said monitoring means for determining the type of response signal received and when said voice answer was transmitted from said destination to evaluate the response time of said destination;
   wherein said destination comprises a telephone switch exchange being manned by at least one operator; and
   wherein when said voice answer was established to transmit from said destination is used to calculate the optimal number of operators required to be present at said telephone switch exchange.

3. In a telecommunication network, a system for evaluating response time from at least one destination, comprising:
   means for generating tones to place a call to said destination;
   means for detecting and discriminating return tones in response to said call;
   means for storing a voice message;
   means for monitoring the progress of said call to determine the type of return tone transmitted from said destination in response to said call and record the time of occurrence of said return tone;
   means electrically connected to said monitoring means for detecting a voice response from said destination; and
   processor means connected to said tone generating means, said detecting and discriminating means, storing means, said call progress monitoring means and said voice detecting means for effecting said storing means to dispatch said voice message to said destination upon receipt of said voice response from said destination; wherein said system terminates connection to said destination in response to the completion of said voice message;
   wherein said processor means further determines from the recorded time of occurrence of said return tone and when said voice response was received from said destination the response time of said destination.

4. The system of claim 3, wherein said tone generating means 2 comprises a DTMF transceiver.

5. The system of claim 3, wherein said storing means comprises a memory means resident in said processor means.

6. The system of claim 3, wherein said call progress monitoring means determines the type of return tones from among at least dial tone, ring back tone, busy tone, and fast busy tone.

7. The system of claim 3, further comprising:
   first interface means connecting said system to a telephone network, wherein said call is sent to said destination via said telephone network; and
   wherein said processor means is connected to said tone generating means, said detecting and discriminating means, said call progress monitoring means and said voice response means via a second interface means through which data, control and address information traverses.

8. The system of claim 3, further comprising:
   means for digitizing said voice message to be stored in said storing means.

9. In a telecommunication network, a system for evaluating response time from at least one destination, comprising:
   means for generating tones to place a call to said destination;
   means for detecting and discriminating return tones in response to said call;
   means for storing a voice message;
   means for monitoring the progress of said call to determine the type of return tone transmitted from said destination in response to said call and record the time of occurrence of said return tone;
   means electrically connected to said monitoring means for detecting a voice response from said destination; and
   processor means connected to said tone generating means, said detecting and discriminating means, said storing means, said call progress monitoring means and said voice detecting means for effecting said storing means to dispatch said voice message to said destination upon receipt of said voice response from said destination;
   wherein said processor means further determines from the recorded time of occurrence of said return tone and when said voice response was received from said destination the response time of said destination;
   wherein said destination comprises a telephone switch exchange being manned by at least one operator; and
   wherein the response time of said destination is used to calculate the optimal number of operators required to be present at said telephone switch exchange.

10. A method of evaluating response time in a telecommunication network, comprising the steps of:
sending a signal to a destination;
detecting and discriminating a response signal transmitted in reply to said sent signal;
detecting and monitoring said response signal to determine the type of audible tone being transmitted from said destination;
recording the time of occurrence of said response signal;
discriminating from said response signal when a voice answer is transmitted from said destination;
dispatching a voice message to said destination in reply to said voice answer;
ending connection to said destination in response to the completion of said voice message; and
computing from the recorded time of occurrence of said response signal and when said voice answer was discriminated the response time of said destination.

11. A method of evaluating response time in a telecommunication network, comprising the steps of:
sending a signal to a destination;
detecting and discriminating a response signal transmitted in reply to said sent signal;
detecting and monitoring said response signal to determine the type of audible tone being transmitted from said destination;
recording the time of occurrence of said response signal;
discriminating from said response signal when a voice answer is transmitted from said destination;
dispatching a voice message to said destination in reply to said voice answer; and
computing from the recorded time of occurrence of said response signal and when said voice answer was discriminated the response time of said destination;
wherein said destination comprises a telephone switch exchange being manned by at least one operator; and
wherein said computing step further comprises the step of:
utilizing the computed response time from said destination to calculate the optimal number of operators required to be present at said telephone switch exchange.

12. In a telecommunication network, a method of evaluating response time from at least one destination, comprising the steps of:
(a) generating tones to place a call to a destination;
(b) detecting return tones transmitted in response to said call;
(c) monitoring the progress of said call to discriminate the type of return tone transmitted from said destination and record the time of occurrence of said return tone;
(d) detecting a voice response transmitted from said destination subsequent to the transmission of said return tone;
(e) dispatching a pre-recorded voice message to said destination upon completion of receipt of said voice response from said destination, wherein said system terminates connection to said destination in response to the completion of said voice message;
(f) computing from the recorded time of occurrence of said return tone and when said voice response was detected the response time of said destination; and
(g) repeating steps (a) to (f) for other to be evaluated destinations.

13. The method of claim 12, wherein said generating step and said detecting step comprise utilizing a DTMF transceiver to respectively generate the tones and detect the return tones.

14. The method of claim 12, further comprising the step of:
storing said pre-recorded voice message in a memory means resident in a computing means; and
wherein said dispatching step comprises transmitting said pre-recorded voice message by a CODEC transceiver.

15. The method of claim 12, wherein said monitoring step comprises discriminating from among at least dial tone, ring back tone, busy tone, fast busy tone and bong tone the type of return tone transmitted from said destination.

16. The method of claim 12, wherein said generating step and said detecting step respectively utilizes a DTMF transceiver, said monitoring step utilizes a call progress detector, said detecting step utilizes a voice detector, said dispatching step utilizes a CODEC transceiver and said computing step utilizes a processor means for effecting the respective functions, said method further comprising the steps of:
interfacing to a telephone network for placing said call to said destination via said telephone network; and
interfacing said processor means to said DTMF transceiver, call progress detector, CODEC transceiver and voice detector.

17. In a telecommunication network, a method of evaluating response time from at least one destination, comprising the steps of:
(a) generating tones to place a call to a destination;
(b) detecting return tones transmitted in response to said call;
(c) monitoring the progress of said call to discriminate the type of return tone transmitted from said destination and record the time of occurrence of said return tone;
(d) detecting a voice response transmitted from said destination subsequent to the transmission of said return tone;
(e) dispatching a pre-recorded voice message to said destination upon completion of receipt of said voice response from said destination;
(f) computing from the recording time of occurrence of said return tone and when said voice response was detected the response time of said destination; and
(g) repeating steps (a) to (f) for other to be evaluated destinations;
wherein said destination comprises a telephone switch exchange being manned by at least one operator; and
wherein said computing step further comprises the step of:
using the computed response time of said destination to calculate the optimal number of operators required to be present at said telephone switch exchange.

* * * * *